United States Patent
Yang

(10) Patent No.: US 9,482,186 B2
(45) Date of Patent: Nov. 1, 2016

(54) LEAF SPRING TYPE VARIABLE VALVE

(71) Applicants: Hyundai Motor Company, Seoul (KR); Kia Motors Corporation, Seoul (KR)

(72) Inventor: Young-Dug Yang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 27 days.

(21) Appl. No.: 14/565,275

(22) Filed: Dec. 9, 2014

(65) Prior Publication Data

US 2016/0025239 A1   Jan. 28, 2016

(30) Foreign Application Priority Data

Jul. 28, 2014   (KR) .................... 10-2014-0095783

(51) Int. Cl.
| F16K 15/00 | (2006.01) |
| F02M 25/00 | (2006.01) |
| F16K 15/03 | (2006.01) |
| F16K 27/02 | (2006.01) |

(52) U.S. Cl.
CPC ............ *F02M 25/00* (2013.01); *F16K 15/033* (2013.01); *F16K 27/0227* (2013.01)

(58) Field of Classification Search
CPC . Y10T 137/7898; F16K 3/04; F16K 15/033; F16K 27/0227; F16K 47/04; F02M 25/00

USPC .............. 137/315.16, 527; 251/298, 303
See application file for complete search history.

(56) References Cited

U.S. PATENT DOCUMENTS

| 4,809,739 A * | 3/1989 | Scaramucci ......... F16K 15/033 |
| | | 137/515.7 |
| 2012/0073277 A1* | 3/2012 | Gafforelli .............. F01N 1/163 |
| | | 60/324 |
| 2014/0311595 A1* | 10/2014 | Bagge ...................... F16K 1/20 |
| | | 137/527 |

FOREIGN PATENT DOCUMENTS

| JP | 10-266837 A | 10/1998 |
| JP | 2001-65342 A | 3/2001 |
| JP | 2006-9667 A | 1/2006 |
| JP | 3813290 B2 | 8/2006 |
| JP | 2009-250328 A | 10/2009 |
| KR | 10-1135075 B1 | 4/2012 |

* cited by examiner

*Primary Examiner* — Mary McManmon
*Assistant Examiner* — Reinaldo Sanchez-Medina
(74) *Attorney, Agent, or Firm* — Morgan, Lewis & Bockius LLP

(57) ABSTRACT

A leaf spring type variable valve may include a housing wherein a hinge support part may be formed at a side thereof and an opening may be formed at another side thereof, a valve cover which may be rotatably secured to the hinge support part of the housing to thereby open or close the opening of the housing, and a leaf spring which may be interposed between a leaf spring support part fixedly secured to the hinge support part of the housing and the valve cover to thereby elastically pressurize the valve cover, wherein the leaf spring has an area in contact with the valve cover.

10 Claims, 4 Drawing Sheets

LEAF SPRING TYPE VARIABLE VALVE

CROSS-REFERENCE TO RELATED APPLICATIONS

The present application claims priority to Korean Patent Application No. 10-2014-95783, filed on Jul. 28, 2014, the entire contents of which is incorporated herein for all purposes by this reference.

BACKGROUND OF THE INVENTION

1. Field of the Invention

The present invention relates to a variable valve for controlling the flow of fluid, and more particularly, to a leaf spring type variable valve which maintains a strong spring characteristic regardless of surrounding environment and prevents waste of design space by installing a leaf spring to have an area in contact between a leaf spring support part fixedly engaged to a housing which has an opening and a valve cover which opens and closes the opening.

2. Description of Related Art

The variable valve in general is used so as to control the flow of fluid such as liquid and gas. Such a variable valve operates in such a manner to open or close a valve cover (gate) depending on the pressure of fluid.

As one example of the use of such a variable valve, there is a circular plate type variable valve installed at a muffler of an exhaust system of a vehicle.

The exhaust gas combusted inside of a vehicle engine has a very high temperature and a speed which is nearly like the velocity of a sound. When such exhaust gas is directly discharged into the air, the exhaust gas quickly expands which generates a sound like a big explosion. For this reason, a muffler is additionally installed at an exhaust gas passage of a vehicle in order to reduce the noise of exhaust by lowering the temperature and pressure of the exhaust gas.

The muffler in general is formed in a shape of a cylinder with a predetermined size. Pluralities of pipes and baffles are installed inside of the muffler so as to reduce the exhaust noise by guiding the expansion, resonance and sound absorption of the exhaust gas when the exhaust gas flows.

The above muffler has a problem wherein when the exhaust resistance is increased to reduce the exhaust noise, the resistance applied to the exhaust stroke is specifically by increasing the back pressure which also decreases the engine output, and on the other hand, when the exhaust resistance is decreased to prevent the loss of the engine output, the exhaust noise increases.

In order to improve the above-mentioned problems, a variable valve attachment type muffler is developed and used, wherein the variable valve is installed inside of the muffler so as to decrease the back pressure while driving over middle and high speed sections where the engine output becomes problematic, but increase the back pressure while driving over a low speed section where the exhaust noise occurs.

FIG. 1A is a perspective view illustrating a configuration of a conventional variable valve and FIG. 1B is a perspective view illustrating a configuration wherein a valve cover is removed from the conventional variable valve.

Referring to FIGS. 1A and 1B, the conventional variable valve is characterized in that a housing 1 having an opening 1a is secured to one of the baffles which form a wall surface partitioning the inside space of the pipe or the muffler installed inside of the muffler (not illustrated), and a valve cover 2 is rotatably secured to the housing 1 to open and close the opening 1a of the housing 1.

The valve cover 2 is installed to be rotatable about a shaft 3a secured to one side of the housing 1 wherein the shaft 3a functions as a rotary shaft. A torsion spring 3 is inserted into the shaft 3a wherein one end of the torsion spring 3 contacts with the valve cover 2 to thereby elastically pressurize the valve cover 2.

The thusly constituted variable valve is operated such that when the pressure of the exhaust gas becomes more than the elastic force of the torsion spring 3, the valve cover 2 is opened, and when the pressure of the exhaust gas is smaller than the elastic force of the torsion spring 3, the valve cover 2 remains closed.

In other words, such a variable valve is closed at a low speed section, so that low frequency noise is reduced, and at the middle and high speed section, the variable valve is gradually opened, so that high frequency noise is attenuated and simultaneously, the resistance of the exhaust gas is decreased, so that the engine output is not influenced at all.

The conventional variable valve however has problems wherein the precise flow control is impossible because the spring characteristic significantly decreases under the use environment above a predetermined high temperature, and the valve is opened wider than a design value, thus causing an interference with surrounding components.

Since the conventional variable valve has problems wherein since one end of the torsion spring 3 simply has a point contact so as to support the valve cover 2, the behavior of the valve cover 2 is not strongly supported, so that some unpleasant sound occurs due to the shaking of the variable valve itself In addition, some unpleasant touching sound also occurs due to the collision between the valve cover 2 and the housing 1 when closing the valve cover 2.

Referring to FIG. 1B, the conventional variable valve is trying to prevent the unpleasant touching sound between the valve cover 2 and the housing 1 by securing a cushioning member 4 made from a SUS MAT material at the inner circumferential surface of the opening 1a of the housing 1, which leads to the increased manufacturing cost and weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a leaf spring type variable valve which is relatively advantageous to prevent the degradation of a spring characteristic under a high temperature environment because the whole portions of the leaf spring support the valve cover, and reduces the unpleasant sound due to the shaking of the variable valve itself.

The present invention may have also been made in an effort to provide a leaf spring type variable valve which may completely prevent the unpleasant touching sound of the variable valve by forming a hinge protrusion and a housing protrusion at a valve cover and a housing, respectively.

It is obvious that the technical problems of the present invention are not limited to the above-described technical problems, and other technical problems not mentioned will be apparent to a person having an ordinary skill in the art from the recitations of the present invention.

An aspect of the present invention provides a leaf spring type variable valve including a housing wherein a hinge support part is formed at one side thereof and an opening is formed at the other side thereof, a valve cover which is rotatably secured to the hinge support part of the housing to thereby open or close the opening of the housing, and a leaf spring which is interposed between a leaf spring support part fixedly secured to the hinge support part of the housing and the valve cover to thereby elastically pressurize the valve cover, wherein the leaf spring may have an area in contact with the valve cover.

The leaf spring type variable valve according to an aspect of the present invention may further may include a first mounting part which is grooved at one side surface of the valve cover, and a second mounting part which is grooved at a lower side surface of the leaf spring support part, wherein the leaf spring may be supported in such a manner that the bottom of the leaf spring is inserted in the first mounting part and the top of the leaf spring is inserted in the second mounting part.

In the leaf spring type variable valve according to an aspect of the present invention, the top of the leaf spring may be bent in the direction of the valve cover to thereby prevent excessive opening of the valve cover.

The leaf spring type variable valve according to an aspect of the present invention may further may include a hinge part which is formed at one end of the valve cover and may include a hinge hole which passes through the hinge part, and an engaging pin which is inserted into a through hole which passes through the hinge support part of the housing and the hinge hole of the hinge part to thereby rotatably secure the valve cover to the housing.

The leaf spring type variable valve according to an aspect of the present invention may further may include a hinge protrusion which protrudes from one end of the valve cover, and a housing protrusion which protrudes from the hinge support part of the housing in the direction of the hinge protrusion, wherein the hinge protrusion may be hooked by the housing protrusion when closing the valve cover.

In the leaf spring type variable valve according to an aspect of the present invention, the valve cover and the housing may be separated from each other by means of the hinge protrusion and the housing protrusion when closing the valve cover by a predetermined distance, so that the valve cover does not completely seal the opening of the housing.

The thusly constituted present invention is characterized in that the leaf spring may have an area in contact with the valve cover over a wide area, thus strongly supporting the valve cover, so that any unpleasant sound due to the shaking of the variable valve may be significantly reduced.

Since the present invention adopts a valve cover supporting method with the aid of the whole portions of the leaf spring, not the valve cover supporting method like the conventional variable valve wherein the valve cover is supported by one strand of the torsion spring, the spring characteristic is not significantly degraded even under the use environment above a predetermined high temperature.

The present invention is characterized in that the leaf spring is fixedly inserted and supported in each of a first mounting part of the valve cover and a second mounting part of the leaf spring support part, so that the leaf spring may be assembled without being thermally influenced from welding, etc., nor decreases the durability.

The present invention is characterized in that the top of the leaf spring is bent toward the valve cover, so that any interference with surrounding components may be significantly decreased by preventing excessive opening of the valve cover.

The present invention is also characterized in that the hinge part of the valve cover and the hinge support part of the housing are engaged using an engaging pin, thereby removing the use of the shaft used in the conventional variable valve and saving manufacturing cost and reducing the weight.

The present invention is further characterized in that the valve cover is controlled not to completely close the opening of the housing using the hinge protrusion protruding from the valve cover and the housing protrusion protruding from the housing, so that it is possible to completely prevent the unpleasant touching sound from the variable valve and decrease manufacturing cost and weight by eliminating the cushioning member used in the conventional variable valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
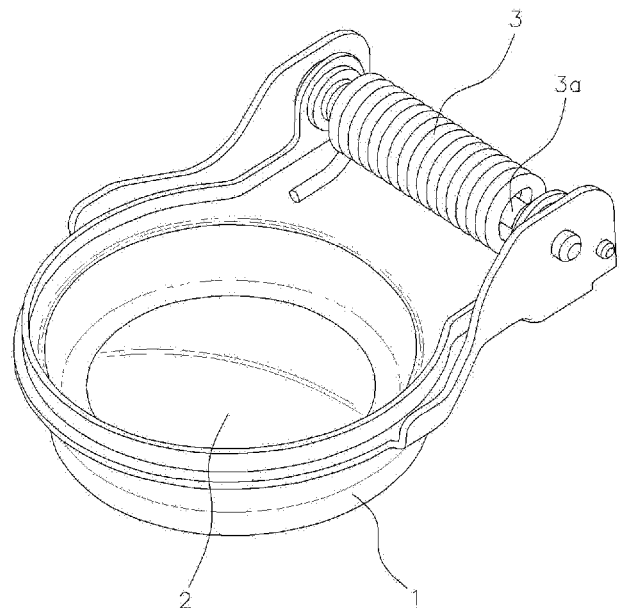
FIG. 1A is a perspective view illustrating a configuration of a conventional variable valve.
Figure 1B:
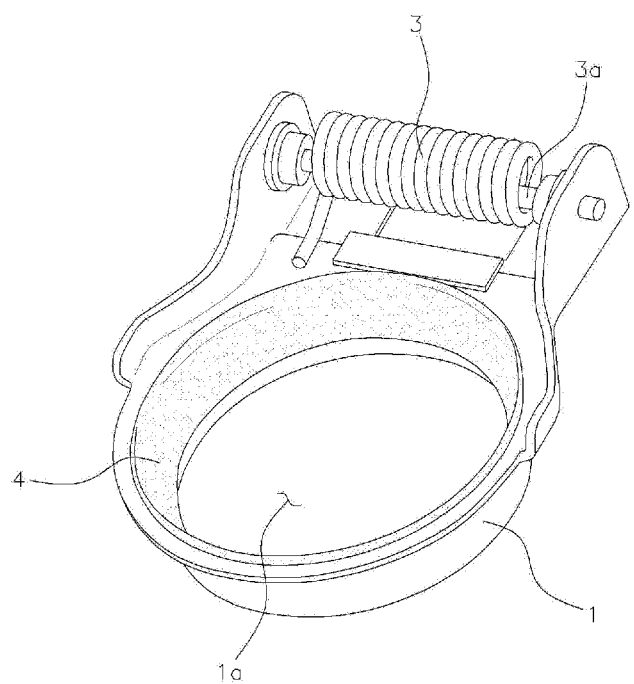
FIG. 1B is a perspective view illustrating a configuration wherein a valve cover is removed from the conventional variable valve.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention will be described in detail with reference to the accompanying drawings to the extent that a person having an ordinary skill in the art can easily carry out the present invention, however, the present invention may be implemented in various forms, and is not limited to the disclosure provided herein below.

The contents not related to the descriptions will be omitted for the sake of clarification of the present invention, and throughout the specification, the same or analogous components will be given the same reference numerals.

The terms or words used in the present specification and the claims should not be limitedly interpreted as the conventional or dictionary-based meaning Such terms or words should be interpreted as having the meaning and concepts matching with the technical concepts of the present invention based on the principle wherein the concepts of the terms and words may be properly defined so as to describe in the best way the inventions of the inventor.

Figure 2:
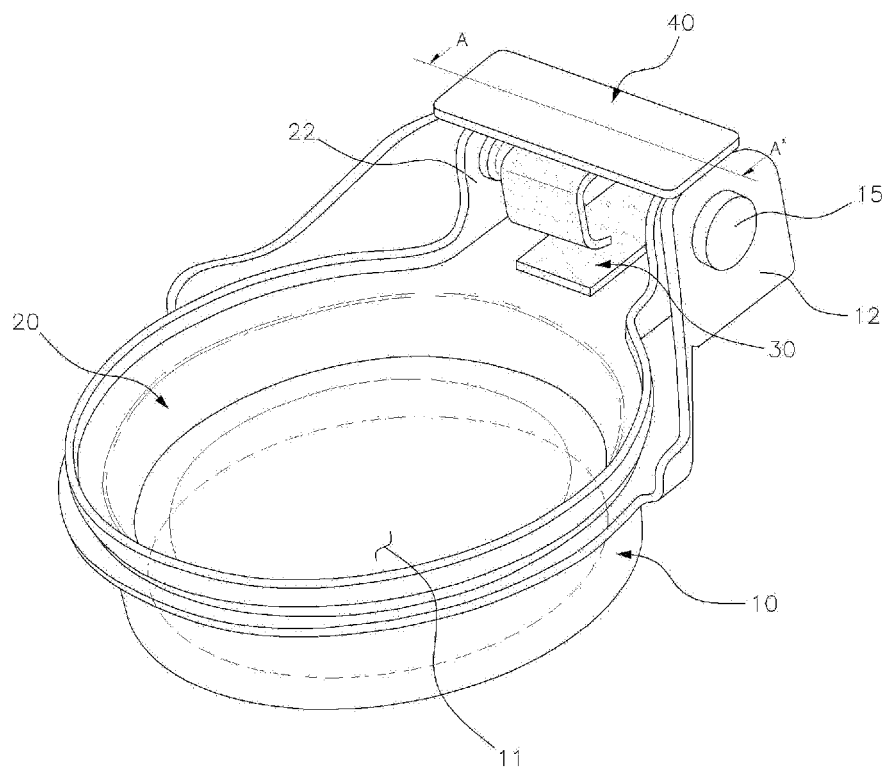
FIG. 2 is a perspective view illustrating a configuration of a leaf spring type variable valve according to an exemplary embodiment of the present invention.
Figure 3:
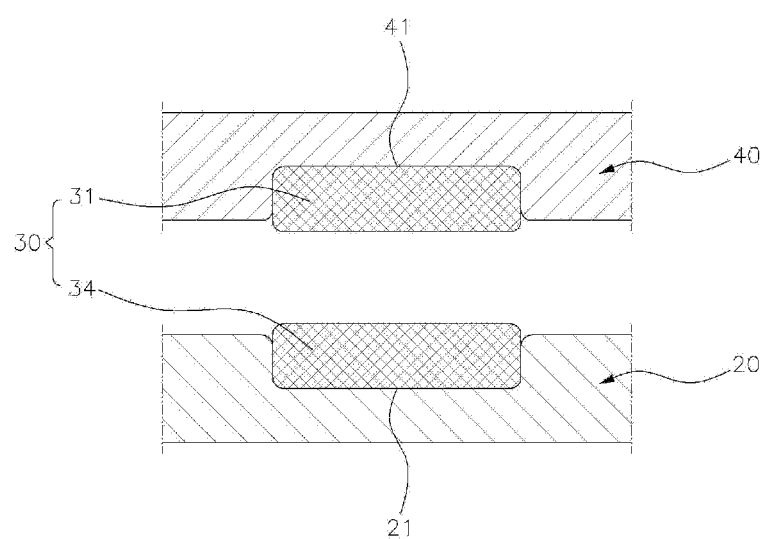
FIG. 3 is a cross sectional view taken along line A-A' of FIG. 2.
Figure 4:
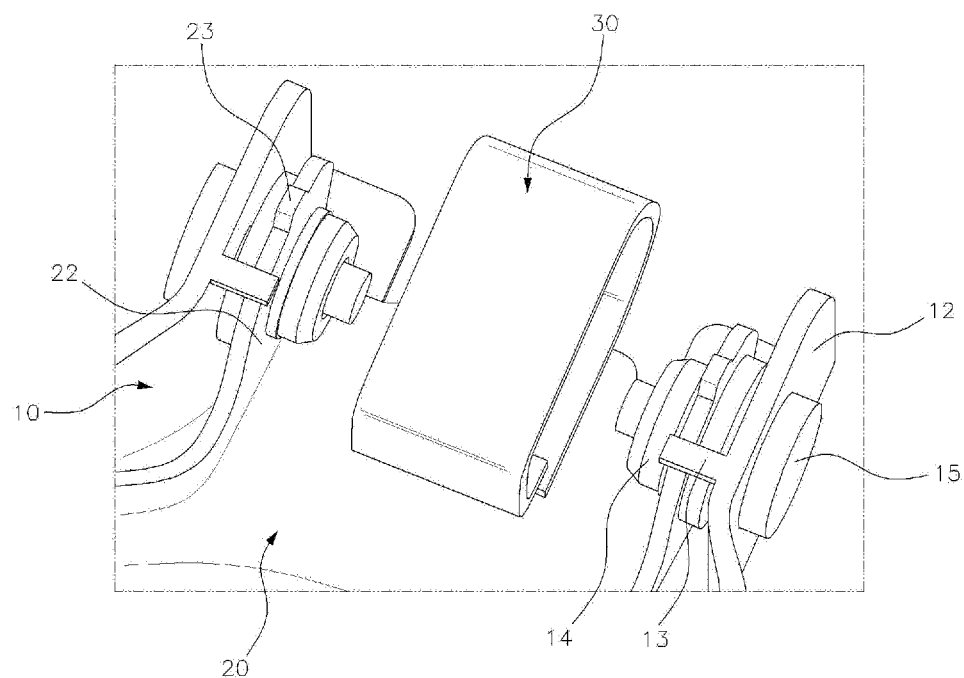
FIG. 4 is a perspective view illustrating a part of a leaf spring type variable valve from which a leaf spring support part is removed according to an exemplary embodiment of the present invention.

FIG. 2 is a perspective view illustrating a configuration of a leaf spring type variable valve according to an exemplary embodiment of the present invention, FIG. 3 is a cross sectional view taken along line A-A' of FIG. 2, and FIG. 4 is a perspective view illustrating a part of a leaf spring type variable valve from which a leaf spring support part 40 is removed according to an exemplary embodiment of the present invention.

The leaf spring type variable valve according to an exemplary embodiment of the present invention includes a housing 10 having an opening 11, a valve cover 20 configured to open and close the opening 11 of the housing 10, and a leaf spring 30 which is interposed between a leaf spring support part 40 fixedly secured to the housing 10 and the valve cover 20 to thereby elastically pressurize the valve cover 20.

The housing 10 is configured such that a pair of hinge support parts 12 are installed facing each other at one side of the housing 10 (at the right top of the illustrated embodiment), and at the other side of the housing 10 (at the lower most portion of the illustrated embodiment), a circular opening 11 is formed in order for fluid to pass through.

The valve cover 20 is rotatably secured to the hinge support part 12 of the housing 10, and the opening 11 of the housing 10 may be opened or closed by the valve cover 20.

Referring to FIG. 4, at one end (at the right top of the illustrated embodiment) of the valve cover 20, a pair of hinge parts 22 are disposed facing each other, and each of the hinge parts 22 is secured to the hinge support part 12 of the housing 10 by means of an engaging pin 15.

In details, a hinge hole passes through each of a pair of the hinge parts 22, and a through hole passes through each of a pair of the hinge support parts 12. In a state where the axial lines of the hinge hole and the through hole are matched, the housing 10 and the valve cover 20 are connected by inserting a pair of the engaging pins 15.

At this time, a bush 14 made from a cushioning material may be installed at an engaged portion between the hinge part 22 and the hinge support part 12. When the valve cover 20 operates, the bush 14 absorbs the shaking and impact between the valve cover 20 and the housing 10.

The conventional variable valve necessarily requires the shaft 3a so as to connect the valve cover (2 of FIG. 1A) and the housing 1 and at the same time to support the torsion spring 3, however, the leaf spring type variable valve according to an exemplary embodiment of the present invention does not additionally need any component having the function of supporting the spring, so that the shaft 3a may be removed, thus saving manufacturing cost and reducing the weight.

Referring to FIG. 2, a leaf-shaped leaf spring support part 40 is fixedly secured to the top of the hinge support part 12 of the housing 10, and a leaf spring 30 is interposed between the leaf spring support part 40 and the valve cover 20.

The leaf spring 30 serves to provide an elastic force to the valve cover 20 in the direction that the valve cover 20 is closed, so that the valve cover 20 remains closed when the pressure of fluid is low, and the valve cover 20 is opened when the pressure of the fluid is higher than the elastic force of the leaf spring 30.

As in the illustrated embodiment, the whole portions of the bottom surface 34 of the leaf spring 30 have area in contacts with the valve cover 20, so that the valve cover 20 may be strongly supported, so that unpleasant noise due to the shaking of the valve cover 20 may be significantly reduced.

Referring to FIG. 3, a first mounting part 21 is grooved at one side surface of the valve cover 20, and a second mounting part 41 is concaved at a lower side surface of the leaf spring support part 40. The top surface 31 and the bottom surface 34 of the leaf spring 30 are inserted into the first mounting part 21 and the second mounting part 41, respectively and fixedly supported.

At this time, the grooving depths of the first mounting part 21 and the second mounting part 41 each may be the same as the thickness of the leaf spring 30, or shallower than the thickness of the leaf spring 30.

Next, the leaf spring 30 may be assembled as the leaf spring 30 is seated and held in place in each of the first mounting part 21 and the second mounting part 41, and additional bolting work or welding work is not required, thus preventing any thermal influence to the leaf spring 30 and the degradation of durability.

Figure 5:
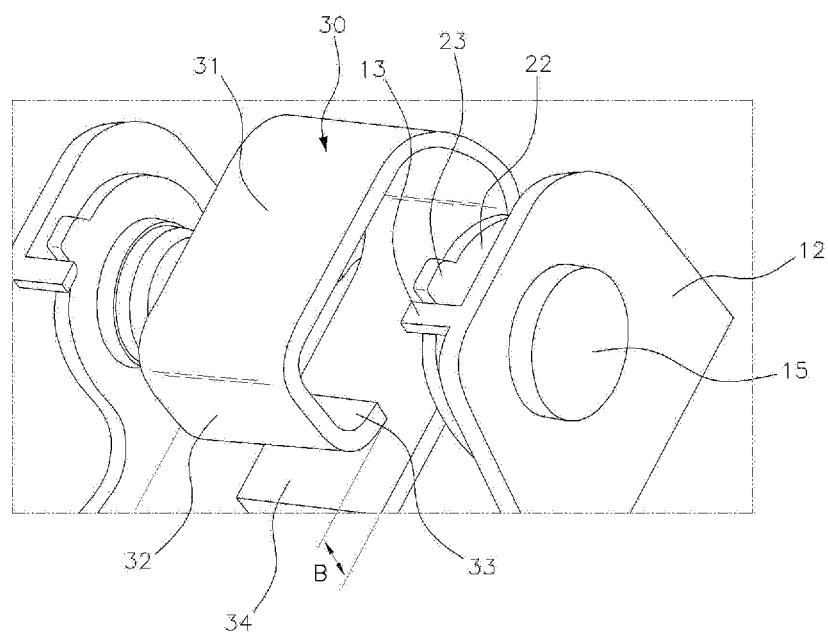
FIG. 5 is a partial perspective view illustrating a configuration wherein a leaf spring support part is removed from a leaf spring type variable valve, and a hinge protrusion is hooked by a housing protrusion according to an exemplary embodiment of the present invention.
Figure 6:
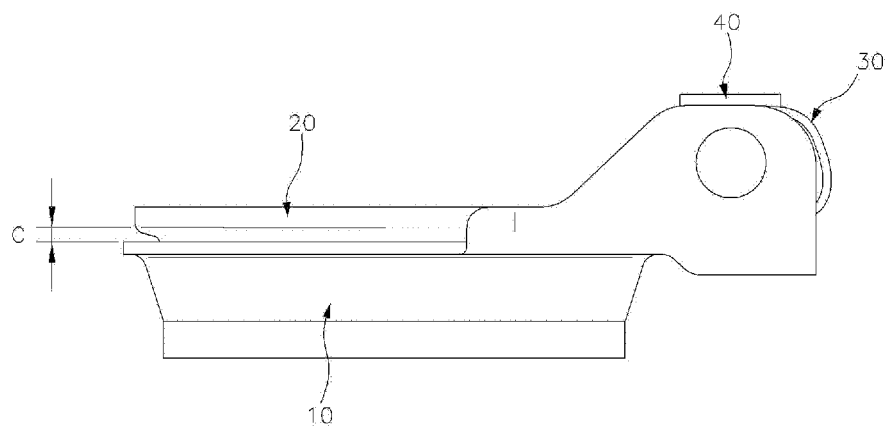
FIG. 6 is a side view illustrating a lateral surface of a leaf spring type variable valve according to an exemplary embodiment of the present invention.

FIG. 5 is a partial perspective view illustrating a configuration wherein a leaf spring support part 40 is removed from a leaf spring type variable valve, and a hinge protrusion 23 is hooked by a housing protrusion 13 according to an exemplary embodiment of the present invention and FIG. 6 is a side view illustrating a lateral surface of a leaf spring type variable valve according to an exemplary embodiment of the present invention.

Referring to FIG. 5, it is preferred that during the designing, the top of the leaf spring 30 is bent in the direction of the valve cover 20 so as to prevent excessive opening of the valve cover 20.

In more detail, as illustrated in the drawings, one end of the top surface 31 of the leaf spring is bent in the direction of the valve cover 20, more specifically, at an angle of about 90° in the downward direction to form a first bent surface 32, and the bottom of the first bent part is rolled inward at an angle of about 90° again to form a second bent surface 33.

Namely, the leaf spring 30 generally looks like a shape of "@". When the valve cover 20 is opened, the bottom of the first bent surface 32 (or the lower surface of the second bent surface 33) contacts with and is supported by the bottom surface 34 of the leaf spring, thereby preventing excessive opening of the valve cover 20.

At this time, the spaced-apart distance "B" between the bottom of the first bent surface 32 (or the lower surface of the second bent surface 33) of the leaf spring and the bottom surface 34 of the leaf spring may be variously determined in consideration of the arranged relationship between the variable valve and the surrounding components, the spring characteristics of the leaf spring 30 and the flow of the fluid when the valve cover 20 is being opened, but it is preferred that the distance "B" is about half of the length of the first bent surface 32.

The above-described configuration comes from the facts that if the spaced-apart distance "B" between the bottom of the first bent surface 32 and the bottom surface 34 is longer than the half of the length of the first bent surface 32, the opening of the valve cover 20 may be excessively limited, so that the resistance of the fluid (for example, the resistance of the exhaust gas) increases too high. If the spaced-apart distance "B" between the bottom of the first bent surface 32 and the bottom surface 34 is shorter than the half of the length of the first bent surface 32, the effects for preventing the excessive opening of the valve cover 20 may be weakened.

Referring to FIG. 5, the hinge protrusion 23 protrudes from one end of the valve cover 20, namely, from the top of the hinge part 22 in the illustrated embodiment, and the housing protrusion 13 protrudes from the hinge support part 12 of the housing 10 in the direction of the hinge protrusion 23.

The hinge protrusion 23 and the housing protrusion 13 are configured to separate from each other when the valve cover 20 is opened and contact with each other when the valve cover 20 is closed, while playing a role of limiting the closing behavior of the valve cover 20.

Namely, the hinge protrusion 23 and the housing protrusion 13 are provided so as to resolve the problems wherein a touching sound occurs between the valve cover 20 and the housing 10 when excessively strong force is applied when the valve cover 20 is closed by the elastic force of the leaf spring 30.

At this time, the hinge protrusion 23 and the housing protrusion 13 are designed in order for the valve cover 20 to nearly contact with the opening 11 of the housing 10 when the valve cover 20 is closed. Preferably, as illustrated in FIG. 6, the hinge protrusion 23 and the housing protrusion 13 are designed in order for the valve cover 20 and the housing 10 to separate from each other by a predetermined interval "C".

When the valve cover 20 is closed, the valve cover 20 remains in an almost closed state like the sealed state while not directly contacting with the housing 10. At this time, the interval "C" between the valve cover 20 and the housing 10 is preferably about 0.2 mm.

The above-described interval comes from the fact that if the interval "C" between the valve cover 20 and the housing 10 is larger than 0.2 mm, the valve cover 20 may not properly perform the sealing function of the variable valve. If the interval "C" between the valve cover 20 and the housing 10 is smaller than 0.2 mm, the valve cover 20 may frequently collide with the housing 10 due to change of the surrounding environment or design tolerance.

As described above, the present invention has effects of improving the unpleasant shaking and touching sound problems of the variable valve while saving manufacturing cost and reducing the weight by substituting the conventional torsion spring (3 of FIG. 1A) with the leaf spring 30, so that the leaf spring 30 has an area in contact with the valve cover 20, and by limiting the behavior of the valve cover 20 using the shape of the leaf spring 30 and the hinge protrusion 23 and the housing protrusion 13.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A leaf spring type variable valve, comprising:
    a housing wherein a hinge support part is formed at a side thereof and an opening is formed at another side thereof;
    a valve cover which is rotatably secured to the hinge support part of the housing to thereby open or close the opening of the housing;
    a leaf spring which is interposed between a leaf spring support part fixedly secured to the hinge support part of the housing and the valve cover to thereby elastically pressurize the valve cover,
    wherein the leaf spring has an area in contact with the valve cover;
    a first mounting part which is grooved at a side surface of the valve cover; and
    a second mounting part which is grooved at a lower side surface of the leaf spring support part,
    wherein the leaf spring is supported such that a bottom of the leaf spring is inserted in the first mounting part and a top of the leaf spring is inserted in the second mounting part.

2. The variable valve of claim 1, wherein a top of the leaf spring is bent in a direction of the valve cover to thereby prevent excessive opening of the valve cover.

3. The variable valve of claim 1, further comprising:
    a hinge part which is formed at an end of the valve cover and includes a hinge hole which passes through the hinge part; and
    an engaging pin which is inserted into a through hole which passes through the hinge support part of the housing and the hinge hole of the hinge part to thereby rotatably secure the valve cover to the housing.

4. The variable valve of claim 1, further comprising:
    a hinge protrusion which protrudes from an end of the valve cover; and
    a housing protrusion which protrudes from the hinge support part of the housing in a direction of the hinge protrusion,
    wherein the hinge protrusion is hooked by the housing protrusion when closing the valve cover.

5. The variable valve of claim 4, wherein the valve cover and the housing separate from each other by the hinge protrusion and the housing protrusion when closing the valve cover by a predetermined distance, so that the valve cover does not completely seal the opening of the housing.

6. A leaf spring type variable valve, comprising:
a housing wherein a hinge support part is formed at a side thereof and an opening is formed at another side thereof;
a valve cover which is rotatably secured to the hinge support part of the housing to thereby open or close the opening of the housing;
a leaf spring which is interposed between a leaf spring support part fixedly secured to the hinge support part of the housing and the valve cover to thereby elastically pressurize the valve cover, wherein the leaf spring has an area in contact with the valve cover;
a hinge protrusion which protrudes from an end of the valve cover; and
a housing protrusion which protrudes from the hinge support part of the housing in a direction of the hinge protrusion, wherein the hinge protrusion is hooked by the housing protrusion when closing the valve cover.

7. The variable valve of claim 6, further comprising:
a first mounting part which is grooved at a side surface of the valve cover; and
a second mounting part which is grooved at a lower side surface of the leaf spring support part,
wherein the leaf spring is supported such that a bottom of the leaf spring is inserted in the first mounting part and a top of the leaf spring is inserted in the second mounting part.

8. The variable valve of claim 6, wherein a top of the leaf spring is bent in a direction of the valve cover to thereby prevent excessive opening of the valve cover.

9. The variable valve of claim 6, further comprising:
a hinge part which is formed at an end of the valve cover and includes a hinge hole which passes through the hinge part; and
an engaging pin which is inserted into a through hole which passes through the hinge support part of the housing and the hinge hole of the hinge part to thereby rotatably secure the valve cover to the housing.

10. The variable valve of claim 6, wherein the valve cover and the housing separate from each other by the hinge protrusion and the housing protrusion when closing the valve cover by a predetermined distance, so that the valve cover does not completely seal the opening of the housing.

* * * * *